United States Patent
Kim et al.

(10) Patent No.: US 11,605,842 B2
(45) Date of Patent: Mar. 14, 2023

(54) CYLINDRICAL BATTERY HAVING PRESSURE SENSOR, AND METHOD FOR MEASURING INTERNAL PRESSURE THEREOF

(71) Applicant: LG CHEM, LTD., Seoul (KR)

(72) Inventors: Jinsoo Kim, Daejeon (KR); Joo Hwan Sung, Daejeon (KR); Minsu Cho, Daejeon (KR); Sunghae Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 564 days.

(21) Appl. No.: 16/629,184

(22) PCT Filed: Dec. 5, 2018

(86) PCT No.: PCT/KR2018/015329
§ 371 (c)(1),
(2) Date: Jan. 7, 2020

(87) PCT Pub. No.: WO2019/132287
PCT Pub. Date: Jul. 4, 2019

(65) Prior Publication Data
US 2020/0227793 A1 Jul. 16, 2020

(30) Foreign Application Priority Data
Dec. 26, 2017 (KR) .................. 10-2017-0180278

(51) Int. Cl.
*H01M 10/48* (2006.01)
*G01L 9/08* (2006.01)
(Continued)

(52) U.S. Cl.
CPC ............ *H01M 10/48* (2013.01); *G01L 9/08* (2013.01); *G01L 11/00* (2013.01); *H01M 50/147* (2021.01)

(58) Field of Classification Search
CPC ....... H01M 10/00; H01M 10/05–0625; H01M 10/48; H01M 50/147; G01L 9/08; G01L 11/00
See application file for complete search history.

(56) References Cited

U.S. PATENT DOCUMENTS

| | | | |
|---|---|---|---|
| 2015/0253935 A1* | 9/2015 | Toda | H03K 17/964 345/174 |
| 2017/0155256 A1 | 6/2017 | Fujimaki et al. | |

(Continued)

FOREIGN PATENT DOCUMENTS

| | | |
|---|---|---|
| CN | 106463301 A | 2/2017 |
| CN | 106816660 A | 6/2017 |

(Continued)

OTHER PUBLICATIONS

International Search Report issued in corresponding International Patent Application No. PCT/KR2018/015329, dated Mar. 18, 2019.
(Continued)

*Primary Examiner* — Nguyen Q. Ha
(74) *Attorney, Agent, or Firm* — Morgan, Lewis & Bockius LLP

(57) ABSTRACT

A cylindrical battery comprising a lithium secondary battery and having a pressure sensor for measuring an internal pressure of the secondary battery, the cylindrical battery as a whole includes: an electrode assembly including a cathode plate, an anode plate, and a separator electrically insulating the cathode plate and the anode plate from each other; the pressure sensor positioned on one side of the electrode assembly and embedded in the cylindrical battery; and a top cap positioned on the other side of the electrode assembly, wherein the pressure sensor has an insulating property.

12 Claims, 7 Drawing Sheets

(51) Int. Cl.
  *G01L 11/00*   (2006.01)
  *H01M 50/147*  (2021.01)

(56) References Cited

U.S. PATENT DOCUMENTS

2017/0310321 A1   10/2017   Toda et al.
2018/0159100 A1   6/2018    Lee et al.

FOREIGN PATENT DOCUMENTS

| CN | 106959093 A | | 7/2017 | | |
|---|---|---|---|---|---|
| CN | 107946682 A | * | 4/2018 | ............ | H01M 10/48 |
| JP | H09-045361 A | | 2/1997 | | |
| JP | 2000-090957 A | | 3/2000 | | |
| JP | 2005-285647 A | | 10/2005 | | |
| JP | 2007-066612 A | | 3/2007 | | |
| JP | 2015220044 A | * | 12/2015 | ............ | H01M 10/04 |
| KR | 10-2007-0078493 A | | 8/2007 | | |
| KR | 10-2010-0088927 A | | 8/2010 | | |
| KR | 10-2015-0082960 A | | 7/2015 | | |
| KR | 10-2016-0078312 A | | 7/2016 | | |
| KR | 10-1660443 B1 | | 9/2016 | | |
| KR | 10-2016-0143589 A | | 12/2016 | | |
| WO | 2016197713 A1 | | 12/2016 | | |

OTHER PUBLICATIONS

Extended European Search Report issued by the European Patent Office dated Sep. 24, 2020 in corresponding European Patent Application No. No. 18894145.4.

* cited by examiner (a)

(b)

CYLINDRICAL BATTERY HAVING PRESSURE SENSOR, AND METHOD FOR MEASURING INTERNAL PRESSURE THEREOF

CROSS-REFERENCE TO RELATED APPLICATION

This application claims priority to and the benefit of Korean Patent Application No. 10-2017-0180278 filed in the Korean Intellectual Property Office on Dec. 26, 2017, the entire contents of which are incorporated herein by reference.

TECHNICAL FIELD

The present invention relates to a cylindrical battery and a method for measuring an internal pressure thereof, and more particularly, to a cylindrical battery having a pressure sensor measuring an internal pressure of the cylindrical battery, and a method for measuring an internal pressure thereof.

BACKGROUND ART

In modern society, in accordance with the daily use of portable devices such as a mobile phone, a laptop computer, a camcorder, a digital camera, and the like, technologies of a field related to the portable devices have been actively developed, and the necessity to develop a secondary battery used for the portable devices has increased.

Examples of the secondary battery include a nickel-cadmium battery, a nickel-hydrogen battery, a nickel-zinc battery, a lithium secondary battery, and the like. Among them, the lithium secondary battery, which is rechargeable and may have a small size and a large capacity, has been widely used in various fields due to a high power capacity and a long lifespan. However, in the lithium secondary battery, there is a risk of explosion of the lithium secondary battery due to characteristics of lithium, which is an unstable element.

The explosion of the lithium secondary battery occurs due to various causes, one of which is an increase in a gas pressure in the lithium secondary battery. In detail, in the case where an electrode is overcharged, overdischarged, short-circuited, or in an overcurrent state, the gas is produced in the lithium secondary battery due to heat generation or ignition of the electrode, and an inner portion of the lithium secondary battery is swollen due to the gas produced as described above to cause the explosion of the lithium secondary battery.

As an apparatus for preventing the explosion of the secondary battery due to the heat generation or the ignition of the electrode, an existing secondary battery has generally used a current interrupt device (CID), or the like. The current interrupt device, which uses the principle that a temperature rises in the current interrupt device itself when an overcurrent flows to the current interrupt device and a contact is broken due to the rising high temperature, may be a protection circuit against an overcurrent (short-circuit) or overheat. FIG. 1 is a view illustrating an example of an existing secondary battery including a current interrupt device. A form of a general secondary battery including the current interrupt device may be confirmed through FIG. 1. Such a related art is disclosed in Korean Patent Laid-Open Publication No. 10-2016-0143589 (entitled "Cap Assembly for Secondary Battery"), and the like.

However, the existing secondary battery as illustrated in FIG. 1 has a problem that it is difficult to confirm an accurate internal pressure of the secondary battery at the time of operation of the current interrupt device. Therefore, there is a need to develop a technology for confirming the internal pressure of the secondary battery in order to further increase safety in using the secondary battery.

DISCLOSURE

Technical Problem

The present invention has been made in an effort to provide a cylindrical battery having a pressure sensor measuring an internal pressure of the cylindrical battery and a method for measuring an internal pressure thereof having advantages of solving a problem such as deformation of an appearance of a conventional secondary battery or explosion of the conventional secondary battery caused by an increase in an internal pressure of the conventional secondary battery at the time of leaving the conventional secondary battery in an overcharged state or at a high temperature, which is a problem in using the conventional secondary battery, and accurately determining a lifespan of the secondary battery.

Further, the present invention has been made in an effort to provide a cylindrical battery having a pressure sensor measuring an internal pressure of the cylindrical battery and a method for measuring an internal pressure thereof having advantages of the pressure sensor allowing a user to effectively prevent expansion or explosion of the cylindrical battery due to an increase in the internal pressure at the time of overcharge or overheat of the cylindrical battery, functioning as a lower insulating member of an electrode assembly and a reversible pressure sensor unit being connected in a wireless manner unlike an existing pressure sensor connected in a wired manner to increase convenience of the use.

Furthermore, the present invention has been made in an effort to provide a cylindrical battery having a pressure sensor measuring an internal pressure of the cylindrical battery and a method for measuring an internal pressure thereof having advantages of grasping a problematic battery by identifying whether or not a non-reversible pressure sensor unit is broken in the case where an internal pressure of the cylindrical battery is increased to a predetermined pressure or more by using a disposable sensor that may be broken at the predetermined voltage as the non-reversible pressure sensor unit.

However, problems to be solved by exemplary embodiments of the present invention are not limited to the above-mentioned problems, and can be variously expanded within the scope of the technical idea included in the present invention.

Technical Solution

An exemplary embodiment of the present invention provides a cylindrical battery comprising a secondary lithium battery comprising an electrode assembly. The cylindrical battery has a pressure sensor for measuring an internal pressure of the secondary battery, the cylindrical battery as a whole including: an electrode assembly including a cathode plate, an anode plate, and a separator electrically insulating the cathode plate and the anode plate from each other; the pressure sensor positioned on one side of the electrode assembly and embedded in the cylindrical battery; and a top cap positioned on the other side of the electrode assembly, wherein the pressure sensor has an insulating property.

The pressure sensor may include at least one of a non-reversible pressure sensor unit and a reversible pressure sensor unit.

A part of the reversible pressure sensor unit in contact with the electrode assembly may be formed of an insulating material.

Another part of the reversible pressure sensor unit may be a piezoelectric element.

The reversible pressure sensor unit may be a wireless sensor.

The non-reversible pressure sensor unit may be formed of a ceramic material.

Another exemplary embodiment of the present invention provides a method for measuring an internal pressure of a cylindrical battery, including: a step in which the internal pressure of the cylindrical battery rises in charging and discharging of the cylindrical battery, the cylindrical battery including an electrode assembly having a cathode plate, an anode plate, and a separator electrically insulating the cathode plate and the anode plate from each other; and a step of measuring the internal pressure of the cylindrical battery rising due to the charging and discharging of the cylindrical battery by a pressure sensor embedded in the cylindrical battery and having an insulating property.

The pressure sensor may be disposed on an opposite side to a top cap with respect to the electrode assembly.

The pressure sensor may include at least one of a non-reversible pressure sensor unit and a reversible pressure sensor unit.

The reversible pressure sensor unit may use a piezoelectric element.

The reversible pressure sensor unit may be a disposable sensor.

The non-reversible pressure sensor unit may be broken in the case where the internal pressure is equal to or larger than a threshold pressure corresponding to an upper limit value of a pressure range in which the cylindrical battery is driven.

Advantageous Effects

According to the cylindrical battery having a pressure sensor measuring an internal pressure of the cylindrical battery and the method for measuring an internal pressure thereof suggested in the present invention, which are to solve a problem such as deformation of an appearance of a conventional secondary battery or explosion of the conventional secondary battery caused by an increase in an internal pressure of the conventional secondary battery at the time of leaving the conventional secondary battery in an overcharged state or at a high temperature, which is a problem in using the conventional secondary battery, the pressure sensor is embedded in the secondary battery, and the pressure sensor measuring the internal pressure of the secondary battery includes at least one of the reversible pressure sensor unit and the non-reversible pressure sensor unit, thereby making it possible to accurately measure a lifespan of the secondary battery through measurement of the internal pressure of the secondary battery.

In addition, according to an exemplary embodiment of the present invention, the pressure sensor may be formed of an insulating material and be disposed on a lower side of the electrode assembly to allow a user to effectively prevent expansion or explosion of the cylindrical battery due to an increase in the internal pressure at the time of overcharge or overheat of the cylindrical battery, and function as a lower insulating member of the electrode assembly.

Further, according to an exemplary embodiment of the present invention, the reversible pressure sensor unit according to the present invention may be connected in a wireless manner unlike an existing pressure sensor connected in a wired manner to increase convenience of the use.

Furthermore, according to the present invention, a disposable sensor that may be broken at the predetermined voltage is used as the non-reversible pressure sensor unit, such that it is identified whether or not the non-reversible pressure sensor unit is broken in the case where the internal pressure of the cylindrical battery is increased to a predetermined pressure or more, thereby making it possible to grasp a problematic battery. Therefore, the non-reversible pressure sensor unit may serve as a blackbox capable of tracking a battery that has caused an accident.

MODE FOR INVENTION

Figure 1:
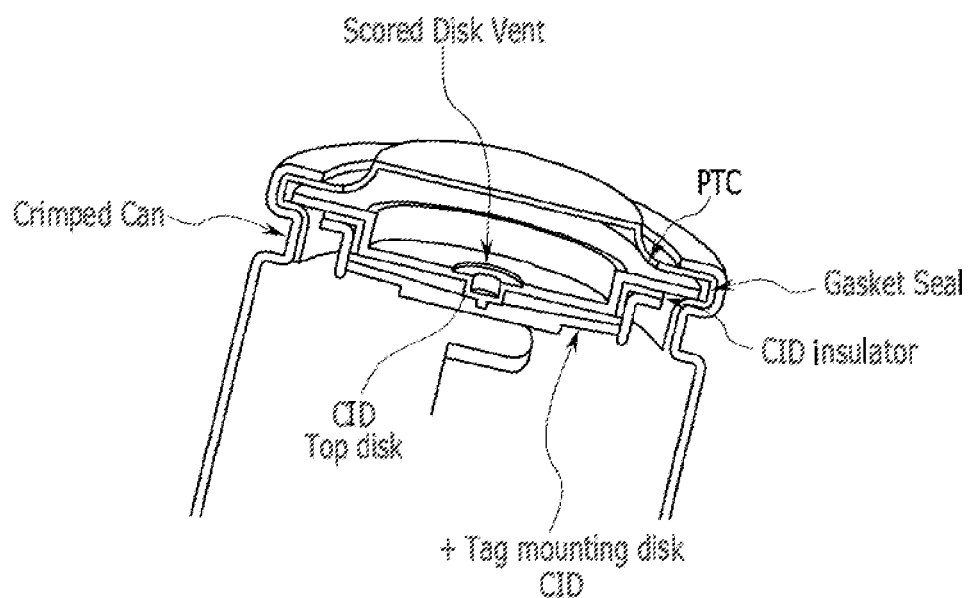
FIG. 1 is a view illustrating an example of an existing secondary battery including a current interrupt device (CID).

Hereinafter, several exemplary embodiments of the present invention will be described in detail with reference to the accompanying drawings so that those skilled in the art to which the present invention pertains may easily practice the present invention. However, the present invention may be implemented in various different forms and is not limited to exemplary embodiments provided herein.

Portions unrelated to the description will be omitted in order to obviously describe the present invention, and similar components will be denoted by the same reference numerals throughout the present specification.

In addition, since sizes and thicknesses of the respective components shown in the accompanying drawings are arbitrarily shown for convenience of explanation, the present invention is not necessarily limited to contents shown in the accompanying drawings. In the drawings, the thickness of layers, films, panels, regions, etc., are exaggerated for clarity. In addition, in the accompanying drawings, thicknesses of some of layers and regions have been exaggerated for convenience of explanation.

In addition, it will be understood that when an element such as a layer, a film, a region, or a plate is referred to as being "on" another element, it can be directly on the other element or intervening elements may also be present. In contrast, when an element is referred to as being "directly on" another element, there are no intervening elements present. In addition, when an element is referred to as being "on" a reference element, it can be positioned on or beneath the reference element, and is not necessarily positioned on the reference element in an opposite direction to gravity.

In addition, throughout the present specification, "comprising" any components will be understood to imply the inclusion of other components rather than the exclusion of other components, unless explicitly described to the contrary.

Further, throughout the specification, the word "plan view" refers to a view when a target is viewed from the top, and the word "cross-sectional view" refers to a view when a cross section of a target taken along a vertical direction is viewed from the side.

Figure 2:
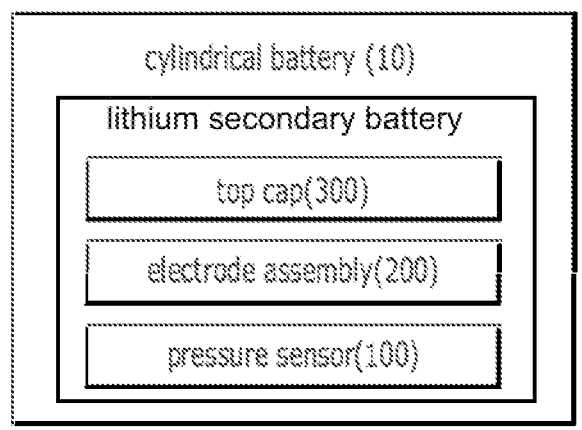
FIG. 2 is a view for describing all components of a cylindrical battery having a pressure sensor according to an exemplary embodiment of the present invention.
Figure 3:
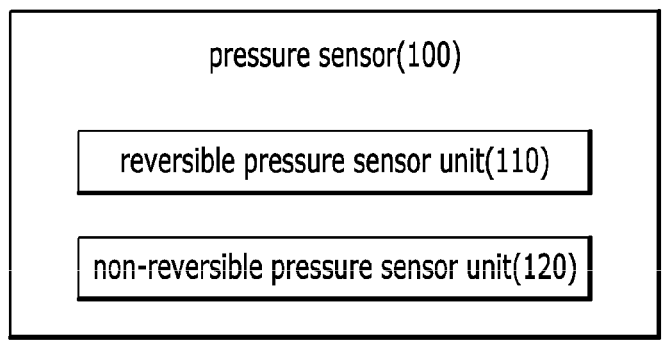
FIG. 3 is a view illustrating components of the pressure sensor measuring an internal pressure of the cylindrical battery according to an exemplary embodiment of the present invention.

FIG. 2 is a view for describing all components of a cylindrical battery having a pressure sensor according to an exemplary embodiment of the present invention.

As illustrated in FIG. 2, a cylindrical battery 10 according to an exemplary embodiment of the present invention, which is a cylindrical battery 10 comprising a secondary lithium battery comprising an electrode assembly 200. The cylindrical battery 10 includes a pressure sensor 100 for measuring an internal pressure of the secondary battery, the cylindrical battery 10 as a whole includes the pressure sensor 100 embedded in the cylindrical battery 10, the secondary lithium battery comprising the electrode assembly 200 coupled to the pressure sensor 100, and a top cap 300 disposed on an upper side of the electrode assembly 200, and the pressure sensor 100 according to the present invention includes a component formed of an insulating material.

The pressure sensor 100 according to the present invention is positioned in the secondary battery and serves to measure an internal pressure of the secondary battery. In the case where the pressure sensor is disposed outside the secondary battery, accuracy of an internal pressure measured value may be decreased. Therefore, the pressure sensor 100 according to the present exemplary embodiment is disposed inside the secondary battery.

The pressure sensor 100 may be disposed on any one surface of the electrode assembly 200. According to an exemplary embodiment, the pressure sensor 100 may be disposed on a lower side of the electrode assembly 200. In this case, the pressure sensor 100 includes a part formed of an insulating material, and may be disposed on the lower side of the electrode assembly 200 to measure the internal pressure of the secondary battery and function as a lower insulating member of the electrode assembly 200. In the case of using the pressure sensor 100 according to the present exemplary embodiment functioning as the lower insulating member, the cylindrical battery 10 does not need to separately include a lower insulator, which is a component of the secondary battery generally used in the related art. Therefore, a volume of the electrode battery 200 may be increased by a volume of the lower insulator.

Figure 4:
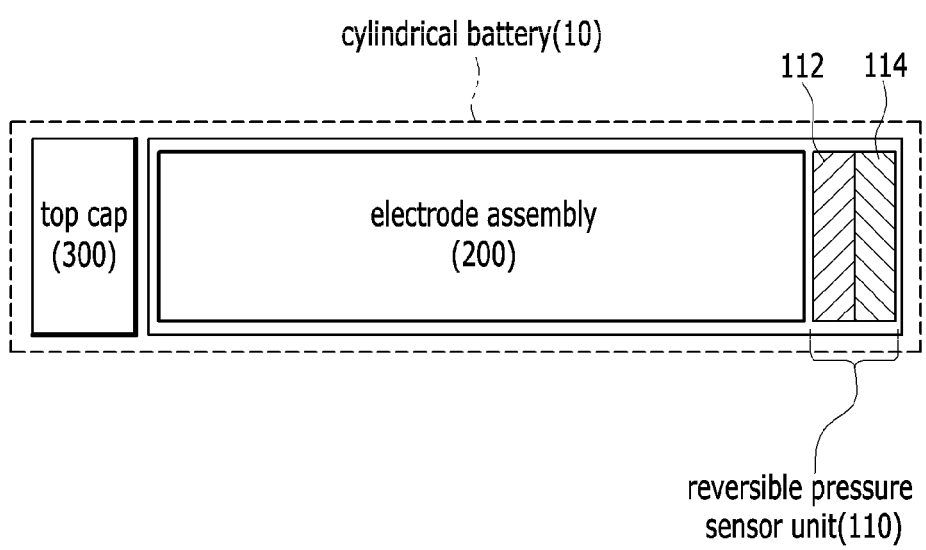
FIG. 4 is a view illustrating a cylindrical battery having a reversible pressure sensor according to an exemplary embodiment of the present invention.

FIG. 4 is a view illustrating a cylindrical battery 10 comprising a secondary lithium battery comprising an electrode assembly 200 and having a reversible pressure sensor 110 according to an exemplary embodiment of the present invention. In detail, FIG. 4 is a view illustrating a form of a cylindrical battery 10 including a reversible pressure sensor unit 110.

As illustrated in FIG. 4, the reversible pressure sensor unit 110 according to an exemplary embodiment of the present invention may be disposed beneath the electrode assembly 200. In this case, one surface of the reversible pressure sensor unit 110 in contact with the electrode assembly 200 may be an insulating member 112 formed of an insulating material, and according to an exemplary embodiment, the other surface of the reversible pressure sensor unit 110 may be a piezoelectric element 114. The piezoelectric element 114, which measures a change in the internal pressure of the secondary battery and transfers a signal generated at the time of being pressed to the outside of the secondary battery, serves to measure the internal pressure of the secondary battery and provide internal pressure state information of the secondary battery to a user. The pressure sensor 100 according to the present invention measuring the internal pressure of the secondary battery may be any element that may measure a voltage change, and is not limited to the piezoelectric element 114 described above. In addition, the reversible pressure sensor unit 110 according to an exemplary embodiment of the present invention may use a wireless sensor. In this case, the internal pressure state information of the secondary battery may be provided to the user without performing separate wiring connection to increase convenience of the use.

Figure 5:
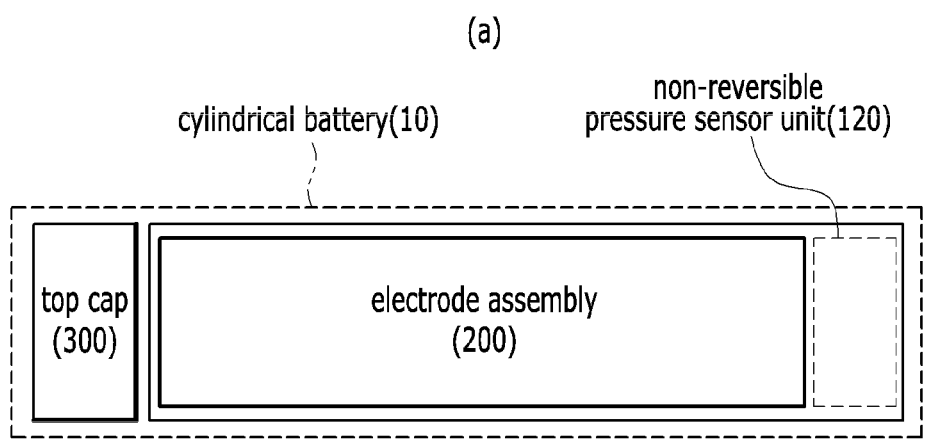
FIGS. 5A and 5B are views illustrating a cylindrical battery having a non-reversible pressure sensor according to an exemplary embodiment of the present invention.
Figure 5:
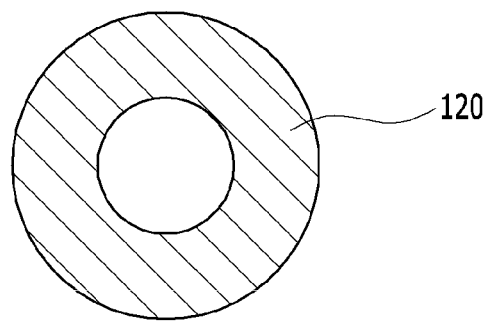

FIGS. 5A and 5B are views illustrating a form of a cylindrical battery having a non-reversible pressure sensor according to an exemplary embodiment of the present invention. It may be confirmed from FIG. 5A that a non-reversible pressure sensor unit 120 is disposed on an opposite side to the top cap 300 with respect to the electrode assembly 200. The non-reversible pressure sensor unit 120, which is a disposable sensor, may include a material that may be broken at a threshold pressure. The threshold pressure means an upper limit value of a pressure range in which the secondary battery performs a normal charging and discharging function, and in the case where the internal pressure of the secondary battery arrives at the threshold pressure, it means that the secondary battery may no longer performs the normal charging and discharging function.

FIG. 5B is an enlarged cross-sectional view of the non-reversible pressure sensor unit 120. The non-reversible pressure sensor unit 120 may have a cylindrical cross section having a hole which is formed at the center thereof and through which an electrode tab of the electrode assembly 200 may penetrate. The non-reversible pressure sensor unit 120 is formed of an insulating material, and the non-reversible pressure sensor unit 120 itself may function as a lower insulating plate in an existing battery. The non-reversible pressure sensor unit 120 according to the present invention may be formed of a ceramic material having an insulating property. However, a material of the non-reversible pressure sensor unit 120 is not limited thereto, and may be any material having an insulating property. The non-reversible pressure sensor unit 120 may function as a blackbox capable of tracking a battery that has caused an accident, which means that it may be grasped whether or not a corresponding battery is the battery that caused the accident by identifying whether or not the irreversible pressure sensor unit 120 is broken.

Figure 6:
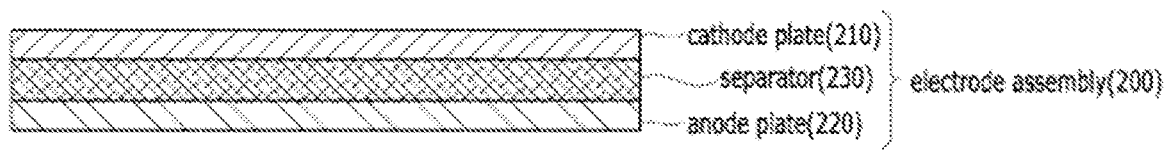
FIG. 6 is a view for describing an electrode assembly of the cylindrical battery having the pressure sensor according to an exemplary embodiment of the present invention.

FIG. 6 is a view for describing an electrode assembly in the cylindrical battery having the pressure sensor according to an exemplary embodiment of the present invention.

It may be confirmed from FIG. 6 that the electrode assembly 200 includes a cathode plate 210, an anode plate 220, and a separator 230, and the separator 230 serves to electrically insulate the cathode plate 210 and the anode plate 220 from each other and is positioned between the cathode plate 210 and the anode plate 220. An insulating thin film having a high ion permeability and mechanical strength may be used as the separator 230, and according to an exemplary embodiment, the electrode assembly 200 may be formed by winding each of the cathode plate 210, the anode plate 220, and the separator 230 in a jelly roll state.

According to another exemplary embodiment of the present invention, the cylindrical battery may further include a temperature sensor (not illustrated). The temperature sensor, which serves to measure a temperature of the cylindrical battery, may include a thermistor, a thermocouple, and the like.

Figure 7:
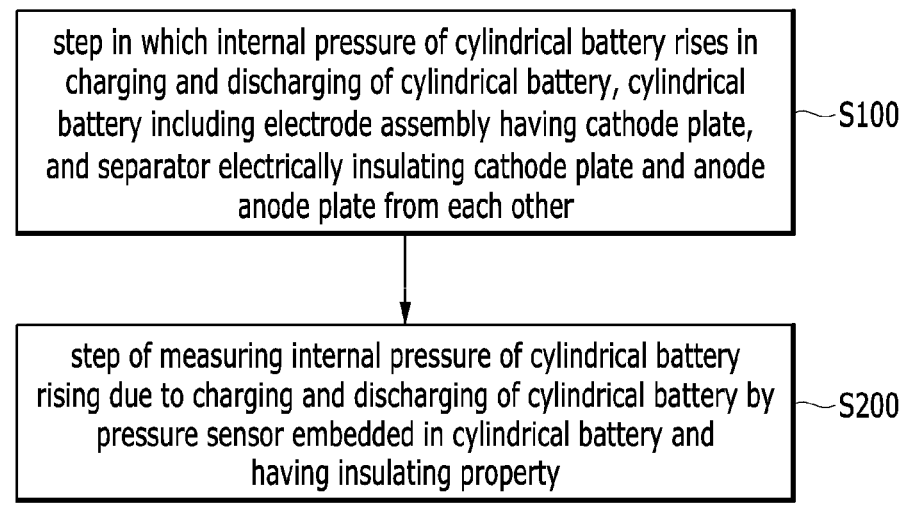
FIG. 7 is a flowchart of a method for measuring an internal pressure of a cylindrical battery according to an exemplary embodiment of the present invention.

FIG. 7 is a flowchart of a method for measuring an internal pressure of a cylindrical battery according to an exemplary embodiment of the present invention.

As illustrated in FIG. 7, the method for measuring an internal pressure of the cylindrical battery 10 using the pressure sensor according to an exemplary embodiment of the present invention, which is a method for measuring an internal pressure of a battery, includes a step (S100) in which the internal pressure of the cylindrical battery rises in charging and discharging of the cylindrical battery, the cylindrical battery including the electrode assembly having the cathode plate 210, the anode plate 220, and the separator 230 electrically insulating the cathode plate 210 and the anode plate 220 from each other; and a step (S200) of measuring the internal pressure of the cylindrical battery rising due to the charging and discharging of the cylindrical battery by the pressure sensor 100 embedded in the cylindrical battery and having an insulating property.

The pressure sensor 100 according to the present invention that may include at least one of the reversible pressure sensor unit 110 and the non-reversible pressure sensor unit 120 may be disposed in the cylindrical battery and accurately measure the internal pressure of the cylindrical battery. According to an exemplary embodiment, the pressure sensor 100 formed of an insulating material may be disposed beneath the electrode assembly, and may not only accurately measure the internal pressure of the cylindrical battery, but also substitute for a function of a lower insulator.

In addition, as an exemplary embodiment, the reversible pressure sensor unit 110 may be a wireless sensor to provide convenience of the use.

Detailed contents related to the respective steps have been described in relation to the cylindrical battery 10 having a pressure sensor according to an exemplary embodiment of the present invention, and a detailed description thereof is thus omitted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: cylindrical battery
100: pressure sensor
110: reversible pressure sensor unit
112: insulating member
114: piezoelectric element
120: non-reversible pressure sensor unit
200: electrode assembly
210: cathode plate
220: anode plate
230: separator
300: top cap

The invention claimed is:

1. A cylindrical battery comprising a lithium secondary battery and having a pressure sensor measuring an internal pressure of the secondary battery, the cylindrical battery as a whole comprising:
   an electrode assembly including a cathode plate, an anode plate, and a separator electrically insulating the cathode plate and the anode plate from each other;
   wherein the pressure sensor is positioned on one side of the electrode assembly and embedded in the cylindrical battery;
   a top cap positioned on an opposite side of the electrode assembly,
   the pressure sensor has an insulating property,
   the pressure sensor includes a reversible pressure sensor unit comprising a piezoelectric element,
   one surface of the pressure sensor, which is in contact with the electrode assembly, is an insulating element, and
   another surface of the reversible pressure sensor unit, which is not in contact with the electrode assembly, is the piezoelectric element.

2. The cylindrical battery of claim 1, wherein:
   the reversible pressure sensor unit comprises a wireless sensor.

3. The cylindrical battery of claim 1, wherein:
   the pressure sensor further includes a non-reversible pressure sensor unit, and
   the non-reversible pressure sensor unit comprises a ceramic material.

4. The cylindrical battery of claim 3, wherein:
   the non-reversible pressure sensor unit comprises a disposable sensor.

5. The cylindrical battery of claim 3, wherein:
   the non-reversible pressure sensor unit is damaged when the internal pressure is equal to or larger than a threshold pressure corresponding to an upper limit value of a pressure range in which the cylindrical battery is driven.

6. A method for measuring an internal pressure of a cylindrical battery, comprising:
   raising the internal pressure of the cylindrical battery by charging and discharging of the cylindrical battery, wherein the cylindrical battery includes an electrode assembly having a cathode plate, an anode plate, and a separator, where the separator electrically insulates the cathode plate and the anode plate from each other; and
   measuring an increase in the internal pressure of the cylindrical battery due to the charging and discharging of the cylindrical battery by a pressure sensor embedded in the cylindrical battery and having an insulating property,
   wherein the pressure sensor is positioned on one side of the electrode assembly and embedded in the cylindrical battery; and a top cap positioned on an opposite side of the electrode assembly,
   the pressure sensor has an insulating property,
   the pressure sensor includes a reversible pressure sensor unit comprising a piezoelectric element,
   one surface of the reversible pressure sensor, which is in contact with the electrode assembly, is an insulating element, and
   another surface of the reversible pressure sensor unit, which is not in contact with the electrode assembly, is the piezoelectric element.

7. The method for measuring an internal pressure of a cylindrical battery of claim 6, wherein:
the cylindrical battery further includes a top cap; and
the pressure sensor is disposed on an opposite side to the top cap with respect to the electrode assembly.

8. The method for measuring an internal pressure of a cylindrical battery of claim 6, wherein:
the pressure sensor further includes a non-reversible pressure sensor unit, and
the non-reversible pressure sensor unit comprises a disposable sensor.

9. The method for measuring an internal pressure of a cylindrical battery of claim 8, wherein:
the non-reversible pressure sensor unit is damaged when the internal pressure is equal to or larger than a threshold pressure corresponding to an upper limit value of a pressure range in which the cylindrical battery is driven.

10. A cylindrical battery comprising a lithium secondary battery and having a pressure sensor measuring an internal pressure of the secondary battery, the cylindrical battery as a whole comprising:

an electrode assembly including a cathode plate, an anode plate, and a separator electrically insulating the cathode plate and the anode plate from each other;

wherein the pressure sensor is positioned on one side of the electrode assembly and embedded in the cylindrical battery;

a top cap positioned on an opposite side of the electrode assembly, the pressure sensor has an insulating property, the pressure sensor includes a non-reversible pressure sensor unit.

11. The cylindrical battery of claim 10, wherein:
the non-reversible pressure sensor unit comprises a ceramic material.

12. The cylindrical battery of claim 10, wherein:
the non-reversible pressure sensor unit comprises a disposable sensor.

* * * * *